(12) United States Patent
Moreira et al.

(10) Patent No.: US 8,214,560 B2
(45) Date of Patent: Jul. 3, 2012

(54) COMMUNICATIONS SUPPORT IN A TRANSACTIONAL MEMORY

(75) Inventors: Jose E. Moreira, Yorktown Heights, NY (US); Patricia M. Sagmeister, Yorktown Heigths, NY (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 12/763,813

(22) Filed: Apr. 20, 2010

(65) Prior Publication Data

US 2011/0258347 A1 Oct. 20, 2011

(51) Int. Cl.
*G06F 3/00* (2006.01)
(52) U.S. Cl. ............................ 710/52; 710/5; 710/62
(58) Field of Classification Search .................. None
See application file for complete search history.

(56) References Cited

U.S. PATENT DOCUMENTS

| | | | |
|---|---|---|---|
| 7,222,187 B2 | 5/2007 | Yeager et al. | |
| 7,512,721 B1 * | 3/2009 | Olson | 710/22 |
| 7,587,575 B2 * | 9/2009 | Moertl et al. | 711/206 |
| 2006/0085591 A1 | 4/2006 | Kumar et al. | |
| 2007/0143287 A1 | 6/2007 | Adl-tabatabai et al. | |
| 2008/0168190 A1 * | 7/2008 | Parthasarathy et al. | 710/22 |
| 2008/0263171 A1 * | 10/2008 | Craft et al. | 709/212 |
| 2008/0288727 A1 | 11/2008 | Baum et al. | |
| 2009/0113443 A1 | 4/2009 | Heller Jr. et al. | |
| 2009/0138890 A1 | 5/2009 | Blake et al. | |
| 2009/0177847 A1 | 7/2009 | Ceze et al. | |
| 2009/0282405 A1 | 11/2009 | Moir et al. | |
| 2009/0292884 A1 | 11/2009 | Wang et al. | |

FOREIGN PATENT DOCUMENTS
WO WO 2006/059343 6/2006

OTHER PUBLICATIONS

Xu et al., "The Research and Implementation of Interfacing Based on PCI Express," 2009, IEEE, pp. 3-116-3-121.*
Hyun et al., "The Design of PCI Express for Future Communication Platform," 2004, IEEE, pp. 734-739.*
Caballero, J. et al., "Polygot: Automatic Extraction of Protocol Message Format using Dynamic Binary Analysis", CCS'07, Oct. 29-Nov. 2, 2007, Alexandria, Virginia, USA, pp. 317-329.
Razavi, A. et al., "A self-organising environment for evolving business activities", The Third International Multi-Conference on Computing in the Global Information Technology, IEEE Computer Society, 2008, pp. 277-283.

* cited by examiner

*Primary Examiner* — Eron J Sorrell
(74) *Attorney, Agent, or Firm* — Scully, Scott, Murphy & Presser, P.C.; Brian Verminski, Esq.

(57) ABSTRACT

A system, method and computer program product are provided for supporting Transactional Memory communications. In one embodiment, the system comprises a transactional memory host with a host transactional memory buffer, an endpoint device, a transactional memory buffer associated with the endpoint device, and a communication path connecting the endpoint device and host. Input/Output transactions associated with the endpoint device executed in transactional memory on the host are stored in both the host transactional memory buffer and the transactional memory buffer associated with the endpoint device. In an embodiment, the Transactional Memory system further comprises an intermediate device located on the communication path between the host and the endpoint device, and an intermediate transactional memory buffer associated with said intermediate devices. In this embodiment, the Input/Output transactions associated with said endpoint device are stored in the intermediate transactional memory buffer associated with the intermediate device.

20 Claims, 4 Drawing Sheets

FILE WRITE:
• TRANSFER IS CLEARLY INDICATED AS TM IO OPERATION (IO TM WRITE)
• ALL DEVICES ON THE PATH ARE INCLUDED IN THE TRANSACTION
• DATA FLOWS ONLY INTO THE TM BUFFERS
• TRANSACTION COMMIT (IO COMMIT) TRIGGERS THE EFFECTIVE WRITING OF THE DATA IN THE ENDPOINT
• TRANSACTION ABORT (IO ABORT) CANCELS THE OPERATION IN ALL DEVICES ON THE PATH
• EXAMPLE: USE NON-POSTED WRITES IN PCIe WITH SPECIAL HEADER INDICATION

FILE READ:
• TRANSFER IS CLEARLY INDICATED AS TM IO OPERATION (IO TM READ)
• DATA IS READ INTO A TM BUFFER IN THE ROOT COMPLEX
• NO SIDE EFFECTS EXPECTED

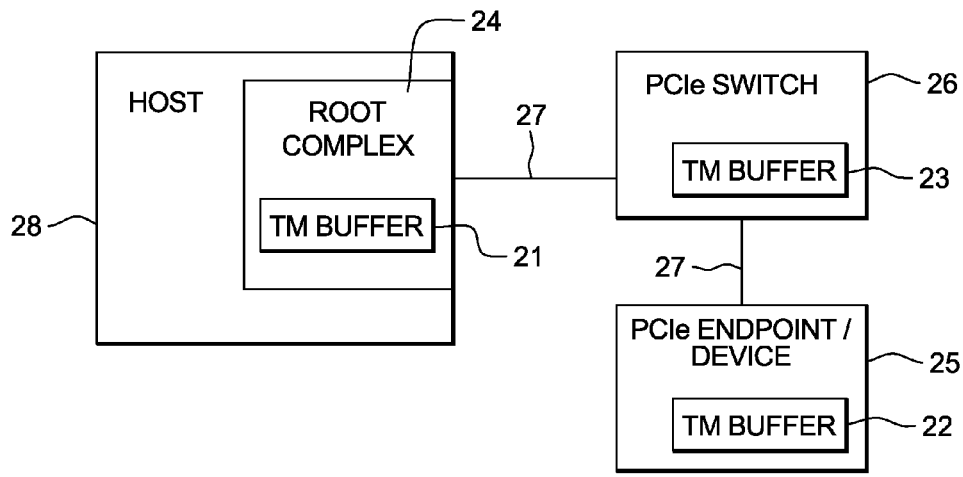

FILE WRITE:
- TRANSFER IS CLEARLY INDICATED AS TM IO OPERATION (IO TM WRITE)
- ALL DEVICES ON THE PATH ARE INCLUDED IN THE TRANSACTION
- DATA FLOWS ONLY INTO THE TM BUFFERS
- TRANSACTION COMMIT (IO COMMIT) TRIGGERS THE EFFECTIVE WRITING OF THE DATA IN THE ENDPOINT
- TRANSACTION ABORT (IO ABORT) CANCELS THE OPERATION IN ALL DEVICES ON THE PATH
- EXAMPLE: USE NON-POSTED WRITES IN PCIe WITH SPECIAL HEADER INDICATION

FILE READ:
- TRANSFER IS CLEARLY INDICATED AS TM IO OPERATION (IO TM READ)
- DATA IS READ INTO A TM BUFFER IN THE ROOT COMPLEX
- NO SIDE EFFECTS EXPECTED

FIG. 2

COMMUNICATIONS THROUGH SOCKETS

CASE 1:
ONLY ONE SINGLE SOCKET WRITE
ALLOWED PER TRANSACTION
• SITUATION IS THE SAME LIKE IN CASE
  OF FILE READ OR WRITE
• RECEIVING PROCESS HAS TO BUFFER
  INCOMING DATA UNTIL THE
  TRANSACTION IS COMMITTED
• TRANSACTION ABORT CANCELS THE
  OPERATION IN ALL PROCESSES

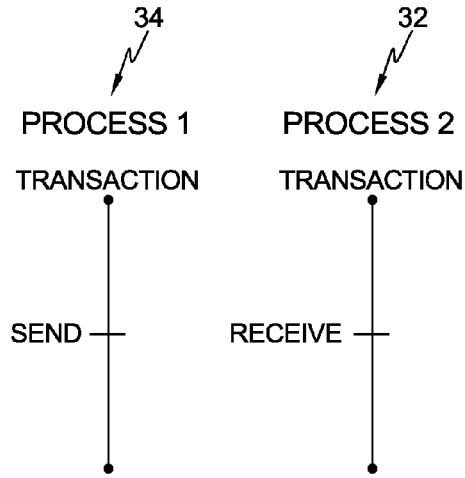

FIG. 3

COMMUNICATIONS THROUGH SOCKETS

CASE 2:
MORE THAN ONE SOCKET READ OR
SOCKET WRITE IS ALLOWED PER
TRANSACTION
• ALL PROCESSES THAT HAVE
  EXCHANGED MESSAGES AND
  PARTICIPATED IN A SEND/RECEIVE
  PAIR AND MUST COMMIT TOGETHER
• SYNCHRONIZATION CAN BE DONE
  WITH A 2-PHASE / TENTATIVE COMMIT
• ALL PROCESSES MUST ALSO ABORT
  TOGETHER

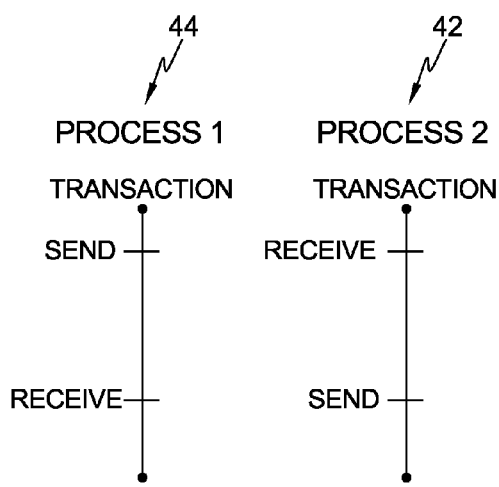

FIG. 4

COMMUNICATIONS SUPPORT IN A TRANSACTIONAL MEMORY

BACKGROUND OF THE INVENTION

1. Field of the Invention

This invention generally relates to data processing, and more specifically, to communications in transactional environments.

2. Background Art

To improve performance, some computer systems may execute multiple threads concurrently. Generally, before a thread accesses a shared resource, it may acquire a lock of the shared resource. In situations where the shared resource is a data structure stored in memory, all threads that are attempting to access the same resource may serialize the execution of their operations in light of mutual exclusivity provided by the locking mechanism. This can be detrimental to system performance and may cause program failures, e.g., due to deadlock bugs.

To reduce or eliminate these adverse affects on performance resulting from utilization of locking mechanisms, some computer systems may use transactional memory. Transactional memory generally refers to a synchronization model that allows multiple threads to concurrently access a shared resource (such as a data structure stored in memory) without acquiring a lock as long as the accesses are non-conflicting, for example, as long as the accesses are directed to different portions of the shared resource.

Transactional memory is a paradigm that allows the programmer to design code as if multiple locations can be accessed and/or modified in a single atomic step. As typically defined, a transactional memory interface allows a programmer to designate certain sequences of operations as "atomic blocks" and "transactions," which are guaranteed by the transactional memory implementation to either take effect atomically and in their entirety (in which case they are said to succeed), or have no externally visible effect (in which case they are said to fail). Thus, with transactional memory, it may be possible in many cases to complete multiple operations with no possibility of another thread observing partial results, even without holding any locks. The transactional memory paradigm can significantly simplify the design of concurrent programs.

Various Transactional Memory systems have been proposed and built to provide a simpler programming model for constructing multithreaded applications that need to control access to shared data structures. These systems allow software running on one thread of execution to optimistically assume that shared data structures can be updated without conflict with the accesses and updates of other threads of execution. The speculative updates to memory are kept pending until the transactional memory system confirms that no conflicts with storage accesses of other threads have occurred.

Transactional memory is widely considered to be the most promising avenue for addressing issues facing concurrent programming and execution. Using transactional memory, programmers may specify what should be done atomically, rather than how this atomicity should be achieved. The transactional memory implementation may then be responsible for guaranteeing the atomicity, largely relieving programmers of the complexity, tradeoffs, and software engineering problems associated with traditional lock-based programming approaches.

Transactional Memory promises significant simplifications to multithreaded programming, as compared to the more traditional approach of lock-based synchronization. In systems employing lock-based synchronization, programmers must specify how to achieve such atomicity, e.g., by associating each critical section with a mutual exclusion lock, establishing conventions for which locks must be acquired by which critical sections in order to ensure correctness, and specifying in what order the locks should be acquired in order to avoid deadlock.

Transactional memory may be implemented in hardware, in software, or in a combination of the two, in various embodiments. Hardware transactional memory (HTM) designs may be characterized as unbounded, bounded, or best effort implementations. For example, a bounded HTM may have a fixed-size, fully associative transactional cache, and a transaction may be committed if and only if it fits in that cache. Alternative best effort designs may piggyback on existing caches and other hardware structures such as store buffers, and therefore may be able to commit one large transaction while being unable to commit another significantly smaller one, depending on how the transactions happen to map to the existing structures.

If used directly, both bounded and best effort HTM designs may impose constraints on programmers because programmers may need to take into account the number or distribution of cache lines accessed by a transaction. Furthermore, the details of such constraints may vary from one machine to another, so programs that must respect those constraints may not be portable.

Software transactional memory (STM) implementations, in which the transactional memory is implemented entirely in software without special hardware support, may provide software engineering benefits similar to those provided by HTM. In STM implementations, coordination between conflicting concurrent transactions is mediated using software. Therefore, STM implementations may be built and used in existing systems without hardware modification. Because STM may be independent of hardware structures such as caches and store buffers, STM implementations may not be subject to the limitations of bounded and best effort HTMs described above. However, STM implementations are typically one to two orders of magnitude slower than HTM implementations, and a substantial performance gap between HTM and STM is likely to remain.

Hybrid Transactional Memory (HyTM) was designed to take advantage of the flexibility and generality of STM, but also to exploit HTM support (if it is available and when it is effective) to boost performance. A HyTM implementation minimally comprises a fully functional STM implementation, because it must work even if there is no HTM support available. Thus, using a HyTM implementation, any transaction may be executed in a software transactional memory mode without special hardware support (e.g., using only instructions that are standard in existing systems). The use of HyTM may allow programmers to develop, test, and execute programs that include transactions using existing systems (i.e., without hardware modification).

Transactional Memory offers many significant advantages. There are, however, limitations and challenges associated with the use of Transactional Memory. The basic idea of Transactional Memory is to be able to transparently undo all operations within a transaction so that no side effects are visible. Input/Output operations such as file writes, are one of the challenges, especially for Transactional Memory, as they do have side effects which cannot be undone. Consequently, Input/Output operations are either not permitted and result in an abort of the transaction or their usage is very restricted, limiting scalability and performance of the system.

BRIEF SUMMARY

In accordance with one aspect of the present invention, there is provided a system, method and computer program product for supporting Transactional Memory communications. In one embodiment, the system comprises a transactional memory host with a host transactional memory buffer, an endpoint device, a transactional memory buffer associated with said endpoint device, and a communication path connecting the endpoint device and host. Input/Output transactions associated with said endpoint device executed in transactional memory on the host are stored in both the host transactional memory buffer and the transactional memory buffer associated with said endpoint device.

In an embodiment, the Transactional Memory system further comprises at least one intermediate device located on the communication path between the host and the endpoint device, and an intermediate transactional memory buffer associated with said intermediate devices. In this embodiment, said Input/Output transactions associated with said endpoint device are stored in the intermediate transactional memory buffer associated with said intermediate device. In an embodiment, the intermediate device is a switch.

In one embodiment, under defined conditions, the host issues a transaction abort command to abort one of the Input/Output transactions; and in response to the host issuing the transaction abort command, said one of the Input/Output transactions is cancelled in the host transactional memory buffer associated with the host, the endpoint memory buffer associated with the endpoint device, and the intermediate transactional buffer associated with the intermediate device.

In an embodiment, under defined conditions, the host issues a transaction commit command to commit one of the Input/Output transactions; and in response to the host issuing the transaction commit command, said one of the Input/Output transactions is written into the endpoint device.

In one embodiment, a command is issued to identify the Input/Output transactions as Transactional Memory Input/Output operations.

In an embodiment, the Input/Output transactions are communicated through one or more sockets, and only one single socket read operation or socket write operation is allowed per Input/Output transaction. In one embodiment, the Input/Output transactions are communicated through one or more sockets; and more than one socket read operation or socket write operation are allowed per Input/Output transaction. In an embodiment, data in the host transactional memory buffer and the endpoint transactional memory buffer are synchronized using a two-phase tentative commit operation.

BRIEF DESCRIPTION OF THE SEVERAL VIEWS OF THE DRAWINGS

FIG. 2 shows the communication between the host device and the endpoint device of FIG. 1 in accordance with an embodiment of the present invention.

FIG. 3 depicts a first example of the communication between the host device and the endpoint device in accordance with an embodiment of the invention.

FIG. 4 shows a second example of the communication between the host device and the endpoint device of FIG. 3 in accordance with an embodiment of the invention.

DETAILED DESCRIPTION

Figure 1:
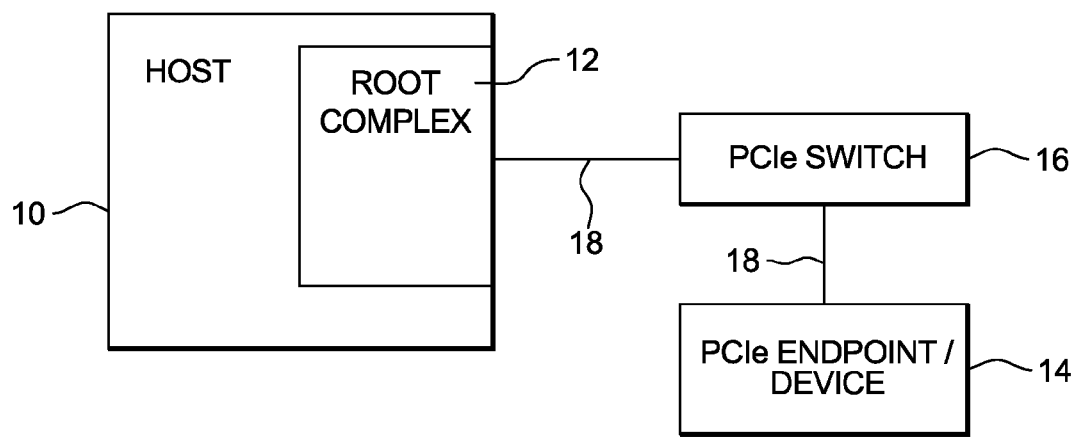
FIG. 1 illustrates a conventional communication between a host device and an endpoint device in a data processing system.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention provides a system, method and computer program product for supporting Transactional Memory communications. As referred to above, in current transaction systems, Input/Output (I/O) operations usually are not part of a transaction, or they trigger an abort of the transaction.

FIG. 1 shows a PCIe communication between a host 10, root complex 12 and another device 14, with switches/routers 16 in the communication path 18. Transactional memory, in current systems, is limited to the host—that is limited to operations that involve only the host.

The present invention broadens the view of Transactional Memory towards the whole system and includes the communication path to the endpoint device into the transaction. In one embodiment, the invention provides a system comprising a transactional memory host with a host transactional memory buffer, an endpoint device, a transactional memory buffer associated with said endpoint device, and a communication path connecting the endpoint device and host. I/O transactions associated with said endpoint device executed in transactional memory on the host are stored in both the host transactional memory buffer and the transactional memory buffer associated with said endpoint device.

More specifically, in one embodiment, the invention includes endpoint devices, and all other devices in the communication path between the host and the endpoint device, in the transaction of the host. In this way, the host and the endpoint device are then in the same transaction.

The invention utilizes collective abort/commit points within the transaction for the host and the endpoint device. Also, the invention, in one embodiment, provides a transaction synchronization mechanism between the host and the endpoint device. To do this, new Transactional Memory commands are used for I/O operations. These commands include IO commit, IO abort, IO TM write, and IO TM read.

FIGS. 2-4 illustrate two embodiments of the invention.

In the embodiment of FIG. 2, specific TM buffers 21, 22, 23 are added to the root complex 24, to the endpoint device 25, and to all the switches 26 on the communication path 27 between the host 28 and the endpoint device 25. The IO subsystem takes care of the synchronization of the IO transactions through the new TM commands.

To perform a file write, the transfer is clearly indicated as a TM IO operation by use of the IO TM write command. All devices on the communication path are included in the transaction; that is, the data are copied into the TM buffer of each device on the communication path. In this operation, data flows only into the TM buffers 21, 22, 23.

A transaction commit (issuance of the IO commit command) triggers the effective writing of the data in the endpoint device 25. A transaction abort (issuance of the IO abort command) cancels the operation in all devices on the path. The file write operation may be used, as an example, with non-posted writes in PCIe with special header indication.

To perform a file read, the transfer is clearly indicated as a TM IO operation by use of the IO TM read command. Data is read into the TM buffer 21 in the root complex 24. In many systems, this operation can be performed with no side effects.

FIGS. 3 and 4 illustrate an embodiment where communication is done through sockets. In a first case, illustrated in FIG. 3, only one single socket read or socket write is allowed per transaction. In this example, the situation is the same as in the file read or file write operations discussed above in connection with FIG. 2. The receiving process 32 buffers incoming data until the transaction is committed. Transaction abort cancels the operation in all processes 32, 34. Canceling an operation means that all the data related to this transaction are deleted and the state is recovered as if none of those operations were executed.

In a second case, shown in FIG. 4, more than one socket read or socket write is allowed per transaction. FIG. 4 shows two processes 42 and 44. In this example, all processes that have exchanged messages and participated in a send/receive pair commit together. Synchronization can be done with a two-phase/tentative commit. All processes also abort together.

In a two-phase/tentative commit, two processes synchronize their commit operation. This can be done, as an example, through a specific commit protocol where process 1, for example, signals process 2 that process 1 has finished the transaction without conflict and that process 1 wants to commit this transaction. Process 2 receives this message from process 1 and signals to process 1 that process 2 also has finished the transaction without conflict and that process 2 is ready to commit. Process 2 can now start committing the transaction immediately after sending this signal to process 1. As soon as process 1 receives the answer from process 2, process 1 also commits its transaction.

Figure 5:
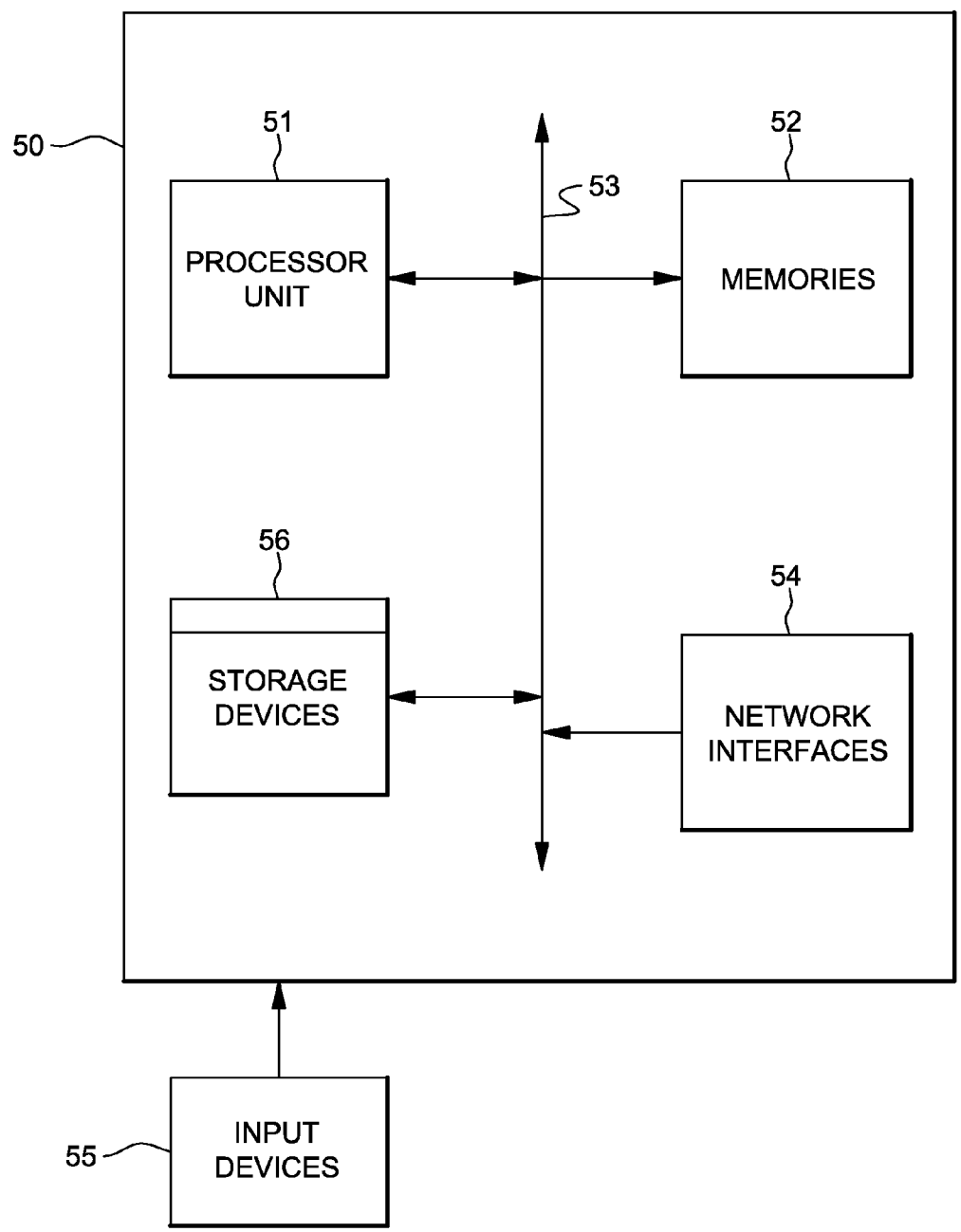
FIG. 5 is a block diagram illustrating an exemplary computer system configured to implement a transactional memory according to an embodiment of the invention.

FIG. 5 illustrates a computing system 50 configured to implement transactional memory as described herein and according to various embodiments of the invention. Computer system 50 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

A computer system 50 may include a processor unit 51 (possibly including multiple processors, a single-threaded processor, a multi-threaded processor, a multi-core processor, etc.). The computer system 50 may also include one or more system memories 52 (e.g., one or more of cache, SRAM DRAM, RDRAM, EDO RAM, DDR RAM, SDRAM, EEPROM, etc.), a system interconnect 53 (e.g., LDT, PCI, ISA, etc.), a network interface 54 (e.g., an ATM interface, an Ethernet interface, a Frame Relay interface, etc.), one or more input devices 55 and one or more storage device(s) 56 (e.g., optical storage, magnetic storage, etc.). The memory medium may include other types of memory as well, or combinations thereof.

Embodiments of the invention may include fewer components or additional components not illustrated in FIG. 5 (e.g., video cards, audio cards, additional network interfaces, peripheral devices such as printers and display monitors, etc.). The processor unit 51, the system memory 52, the network interface 54, and the storage device(s) 56, are coupled to the system interconnect 53.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A Transactional Memory system comprising:
    a transactional memory host with a host transactional memory buffer;
    an endpoint device;
    a transactional memory buffer associated with said endpoint device; and
    a communication path connecting the endpoint device and host; and
    wherein Input/Output transactions associated with said endpoint device executed in transactional memory on the host are stored in both the host transactional memory buffer and the transactional memory buffer associated with said endpoint device, and when one of the transactions is successful, the host issues a transaction commit command, and in response to said commit command, said one of the transactions is sent to the endpoint device from the transactional memory buffer associated with the endpoint device.

2. The Transactional Memory system comprising:
    a transactional memory host with a host transactional memory buffer;
    an endpoint device;
    a transactional memory buffer associated with said endpoint device;
    a communication path connecting the endpoint device and host;
    at least one intermediate device located on the communication path between the host and said endpoint device; and
    an intermediate transactional memory buffer associated with said intermediate devices; and
    wherein said Input/Output transactions associated with said endpoint device are stored in the host transactional memory buffer, the transactional memory buffer associated with the endpoint device, and the intermediate transactional memory buffer associated with said intermediate device.

3. The Transactional Memory system according to claim 2, wherein the intermediate device is a switch.

4. The Transactional Memory system according to claim 2, wherein:
    under defined conditions, the host issues a transaction abort command to abort one of the Input/Output transactions; and
    in response to the host issuing the transaction abort command, said one of the I/O transactions is cancelled in the intermediate transactional memory buffer associated with the endpoint device.

5. The Transactional Memory system according to claim 4, wherein in response to the host issuing the transaction abort command, said one of the Input/Output transactions is cancelled from the host transactional memory buffer associated with the host, and from the intermediate transactional memory buffer associated with the intermediate device.

6. The Transactional Memory system according to claim 2, wherein:
    under defined conditions, the host issues a transaction commit command to commit one of the Input/Output transactions; and
    in response to the host issuing the transaction commit command, said one of the Input/Output transactions is written into the endpoint device.

7. The Transactional Memory system according to claim 1, wherein a command is issued to identify the I/O transactions as Transactional Memory Input/Output operations.

8. The Transactional Memory system according to claim 1, wherein:
    the Input/Output transactions are communicated through one or more sockets; and
    only one single socket read operation or socket write operation is allowed per I/O transaction.

9. The Transactional Memory system according to claim 1, wherein:
    the Input/Output transactions are communicated through one or more sockets; and
    more than one socket read operation or socket write operation are allowed per Input/Output transaction.

10. The Transactional Memory system according to claim 9, wherein data in the host transactional memory buffer and in the endpoint transactional memory buffer are synchronized using a two-phase tentative commit operation.

11. A method of supporting Transactional Memory communications between a host device and an endpoint device in a data processing system, the method comprising:
    associating a host transactional memory buffer with the host device, and associated an endpoint transactional memory buffer with the endpoint device;
    using the host transactional memory buffer and the endpoint transactional memory buffer for storing transactions involving the host device and the endpoint device; and
    providing a series of commands to synchronize the transactions in the host transactional memory buffer and the endpoint transactional memory buffer, wherein after each successful one of the transactions, identical sets of data associated with said successful one of the transactions, are stored in the host transactional memory buffer associated with the host device and in the endpoint transactional memory buffer associated with the endpoint device store; and for each of the transactions that is not successful, the data associated with said each transaction that is not successful, are cancelled from the host transactional memory buffer associated with the host device and from the endpoint transactional memory buffer associated with the endpoint device.

12. The method according to claim 11, wherein said series of commands includes a commit command for writing the data associated with each successful transaction into said endpoint device.

13. The method according to claim 12, wherein said series of commands further includes an abort command for cancelling the data associated with each transaction that is not successful, from the host transactional memory buffer associated with the host device and from the endpoint transactional memory buffer associated with the endpoint device.

14. The method according to claim 11, wherein the host device and the endpoint device are connected by a communication path, the communication path includes an intermediate device between the host device and the endpoint device, and an intermediate transactional memory buffer is associated with said intermediate device, and wherein:

after each successful one of the transactions, identical sets of data associated with said each successful one of the transactions, are stored in the host transactional memory buffer associated with the host device, in the endpoint transactional memory buffer associated with the endpoint device, and in the intermediate transactional memory buffer associated with the intermediate device; and for each of the transactions that is not successful, the data associated with said each transaction that is not successful, are cancelled from the host transactional memory buffer associated with the host device, from the endpoint transactional memory buffer associated with the endpoint device, and from the intermediate transactional memory buffer associated with the intermediate device.

15. The method according to claim 11, wherein:
the host device is a processor unit;
the endpoint device is an input/output unit; and
the transactions are Input/Output operations between the processor unit and the input/output unit.

16. An article of manufacture comprising:
at least one tangible computer readable device having computer readable program code logic tangibly embodied therein to execute machine instructions in one or more processing units for supporting Transactional Memory communications between a host device and an endpoint device in a data processing system, said computer readable program code logic, when executing, performing the following:
associating a host transactional memory buffer with the host device, and associated an endpoint transactional memory buffer with the endpoint device;
using the host transactional memory buffer and the endpoint transactional memory buffer for storing transactions involving the host device and the endpoint device; and
providing a series of commands to synchronize the transactions in the host transactional memory buffer and the endpoint transactional memory buffer, wherein after each successful one of the transactions, identical sets of data associated with said successful one of the transactions, are stored in the host transactional memory buffer associated with the host device and in the endpoint transactional memory buffer associated with the endpoint device store; and for each of the transactions that is not successful, the data associated with said each transaction that is not successful, are cancelled from the host transactional memory buffer associated with the host device and from the endpoint transactional memory buffer associated with the endpoint device.

17. The article of manufacture according to claim 16, wherein said series of commands includes a commit command for writing the data associated with each successful transaction into the endpoint device.

18. The article of manufacture according to claim 17, wherein said series of commands further includes an abort command for cancelling the data associated with each transaction that is not successful, from the host transactional memory buffer associated with the host device and from the endpoint transactional memory buffer associated with the endpoint device.

19. The article of manufacture according to claim 16, wherein the host device and the endpoint device are connected by a communication path, the communication path includes an intermediate device between the host device and the endpoint device, and an intermediate transactional memory buffer is associated with said intermediate device, and wherein:

after each successful one of the transactions, identical sets of data associated with said each successful one of the transactions, are stored in the host transactional memory buffer associated with the host device, in the endpoint transactional memory buffer associated with the endpoint device, and in the intermediate transactional memory buffer associated with the intermediate device store; and for each of the transactions that is not successful, the data associated with said each transaction that is not successful, are cancelled from the host transactional memory buffer associated with the host device, from the endpoint transactional memory buffer associated with the endpoint device, and from the intermediate transactional memory buffer associated with the intermediate device.

20. The article of manufacture according to claim 16, wherein:
the host device is a processor unit;
the endpoint device is an input/output unit; and
the transactions are Input/Output operations between the processor unit and the input/output unit.

* * * * *